(12) United States Patent  (10) Patent No.: US 8,489,986 B2
Haug, III et al.  (45) Date of Patent: Jul. 16, 2013

(54) CORRECTING POSITIONS OF SHAPES IN A DIAGRAM

(75) Inventors: John Edward Haug, III, Redmond, WA (US); Amit Anilkumar Velingkar, Redmond, WA (US); Jie Li, Bellevue, WA (US); Ramona Pousti, Kirkland, WA (US); David Gordon Bradlee, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1196 days.

(21) Appl. No.: 12/024,084

(22) Filed: Jan. 31, 2008

(65) Prior Publication Data

US 2009/0199088 A1   Aug. 6, 2009

(51) Int. Cl.
*G06T 11/60* (2006.01)

(52) U.S. Cl.
USPC .......................................... 715/244; 345/440

(58) Field of Classification Search
USPC .................. 715/244, 245, 249, 243; 345/441, 345/468, 247, 440
See application file for complete search history.

(56) References Cited

U.S. PATENT DOCUMENTS

| | | | |
|---|---|---|---|
| 4,933,865 A | 6/1990 | Yamamoto et al. | |
| 6,374,200 B1 | 4/2002 | Nakagawa | |
| 6,792,593 B2 | 9/2004 | Takashima et al. | |
| 2003/0222921 A1 | 12/2003 | Rummel | |
| 2006/0136825 A1 | 6/2006 | Cory et al. | |
| 2006/0209084 A1* | 9/2006 | Wong et al. | 345/629 |
| 2006/0209085 A1* | 9/2006 | Wong et al. | 345/629 |
| 2007/0089080 A1 | 4/2007 | Sakuraba | |
| 2007/0103468 A1 | 5/2007 | Saini et al. | |
| 2007/0162844 A1 | 7/2007 | Woodall et al. | |
| 2007/0168858 A1* | 7/2007 | Gerhard et al. | 715/530 |
| 2007/0208996 A1* | 9/2007 | Berkner et al. | 715/521 |
| 2007/0266307 A1 | 11/2007 | Panditharadhya et al. | |
| 2008/0012859 A1* | 1/2008 | Saillet et al. | 345/440 |
| 2008/0068398 A1* | 3/2008 | Nickolayev et al. | 345/619 |

OTHER PUBLICATIONS

Lay out shapes automatically, Visio 2007, published Nov. 9, 2006 by microsoft.com.*
"Modifying a container to support automatic layout", IBM Corporation 2000-2005, pp. 4.
Seybold, et al., "An Effective Layout Adaptation Technique for a Graphical Modeling Tool", Proceedings of the 25th International Conference on Software Engineering (ICSE'03), IEEE Computer Society 2003. pp. 2.
"ConceptDraw 7 Pro for Mac", BestShareware.net, 2007, pp. 1-4.

(Continued)

*Primary Examiner* — Stephen Hong
*Assistant Examiner* — Ahamed I Nazar
(74) *Attorney, Agent, or Firm* — Hope Baldauff, LLC

(57) ABSTRACT

Technologies are described herein for correcting the layout of shapes in a diagram. A request is received to correct the diagram layout. The positional relationships between the shapes in the diagram are determined through the creation of a dependency tree. According to various embodiments, the dependency tree defines parent-child relationships within the diagram and the physical position of shapes with respect to one another. Using the dependency tree and layout rules, the shapes within the diagram may be repositioned to correct misalignment and uneven spacing to make minor corrections in the layout while preserving the general configuration of the original layout. Embodiments provide for layout corrections of diagrams including regions that encompass member shapes and provide for conflict resolution when layout corrective actions result in overlaps of shapes, regions, or page breaks.

17 Claims, 12 Drawing Sheets

OTHER PUBLICATIONS

Korotkov, "Automatic Layout of State Diagrams", pp. 1-6.

"Modifying a container to support automatic layout", IBM Corporation, Retrieved Jan. 15, 2008, pp. 4.

Seybold, et al., "An Effective Layout Adaptation Technique for a Graphical Modeling Tool", 2003, Proceedings of the 25th International Conference on Software Engineering (ICSE'03), IEEE Computer Society 2003. pp. 2.

Korotkov, "Automatic Layout of State Diagrams", Retrieved Jan. 15, 2008, pp. 1-6.

* cited by examiner

Placement tree

Dependency tree

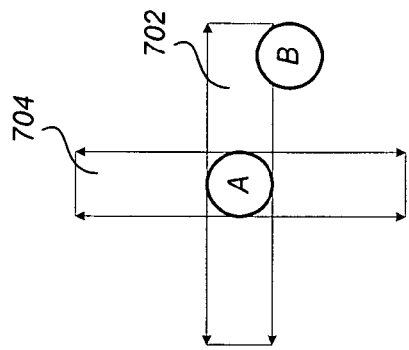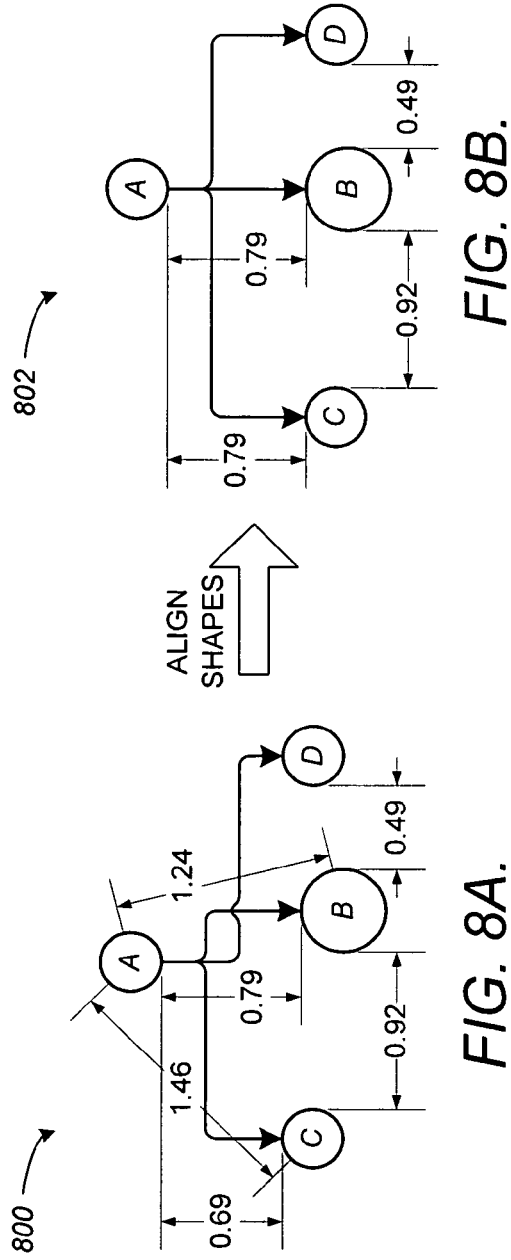

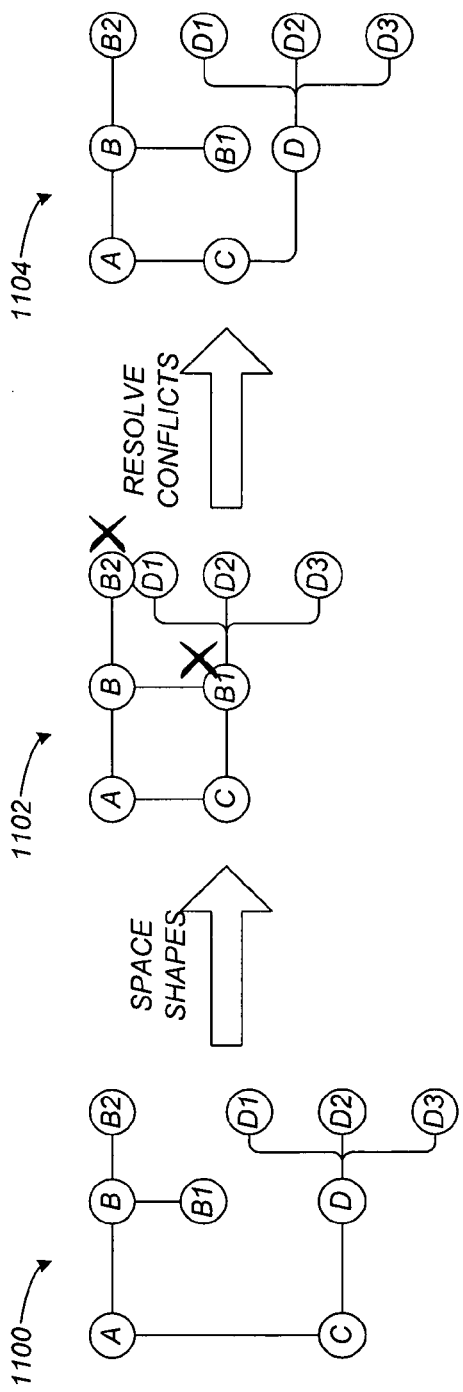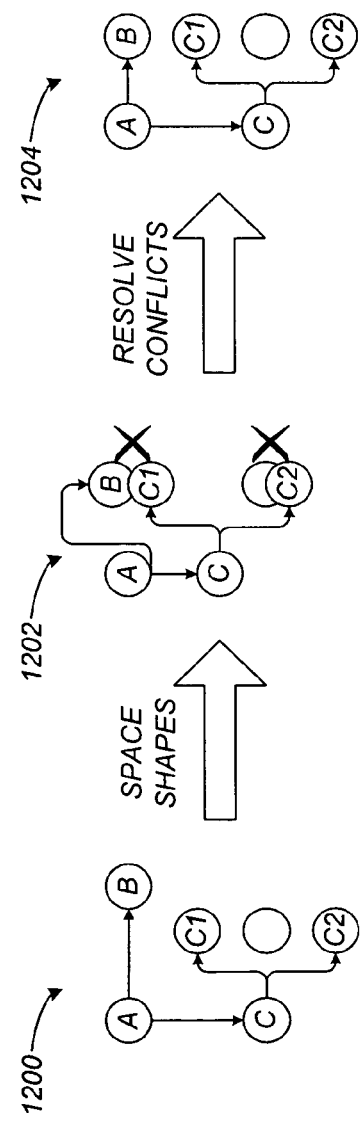

CORRECTING POSITIONS OF SHAPES IN A DIAGRAM

BACKGROUND

Diagramming applications are commonly used to create flowcharts and other diagrams. When creating and editing a diagram, users often drag and drop shapes and connectors into the diagram, re-size shapes, add text, move shapes, insert shapes, flip and rotate shapes and portions of the diagram, as well as various other actions. In doing so, shapes and connectors often become misaligned and unevenly spaced apart. In an effort to create a professional and visually appealing end product, users may find it necessary to spend a significant amount of time nudging shapes and corresponding connectors around to properly align and space the shapes within the diagram.

It is with respect to these considerations and others that the disclosure made herein is presented.

SUMMARY

Technologies are described herein for making minor corrections to the positions of shapes in a diagram in order to properly align and space the shapes while maintaining the existing layout to preserve the intent of the diagram creator. In particular, through the utilization of the concepts presented herein, a user may properly align and space shapes in a diagram without manual manipulation of the shapes and connectors within the diagram. The concepts presented herein allow a diagramming application to properly space and align shapes of a portion or entire diagram upon request, after a new shape is inserted into the diagram, when a portion of the diagram rests on a page break, when any portion of the diagram is flipped or rotated, or in any other situation in which the diagram is manipulated in a manner that would benefit from realignment.

Moreover, the disclosure provided herein allows a diagramming application to apply the layout correction concepts described below to shapes within a fixed region, such as a container, as well as to the regions themselves, while maintaining shape membership within the regions. After correcting a diagram layout, the concepts presented herein allow a diagramming application to identify and resolve layout conflicts that might result from the realignment and spacing actions.

According to one aspect presented herein, in response to receiving a request to correct a diagram layout, a positional relationship between the shapes within the diagram is determined according to the current layout of the diagram. Implementations include defining parent-child relationships between the diagram shapes such that each shape has only a single parent. A dependency tree is created to define relationships between the diagram shapes according to the physical position of the related shapes with respect to one another within the diagram. Layout rules are then utilized to reposition the shapes according to the layout correction request, using the dependency tree to determine which shapes move with the current shape being repositioned and to determine where the shapes are to be repositioned in order to maintain the look and feel of diagram prior to performing the layout corrections.

According to other aspects, before a shape is repositioned, a determination is made as to whether the shape is an entry node of a region such as a container. If the shape is an entry node of a region, then the region boundaries are estimated and set before continuing with other shapes outside of the region. The boundaries of the region are set in order to preserve the region membership and keep the size of the region as compact as possible when making further adjustments to the diagram.

According to additional implementations, the diagramming application identifies conflicts resulting from the repositioning of one or more shapes within the diagram. Conflicts may arise in situations in which shapes that have been repositioned to correct alignment and spacing issues now overlap other shapes, regions, or page breaks. In these situations, then the concepts described herein provide rules to correct these types of conflicts. For instance, upon identifying a conflicting shape, the diagram may be searched for space in the general direction of the positional offset of the conflicting shape from its parent shape and the conflicting shape repositioned to the located space.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 7 is an illustrative diagram showing the virtual overlap between two shapes according to various embodiments presented herein;

FIGS. 8A and 8B are illustrative diagrams showing a shape layout before and after alignment correction procedures have been performed, respectively, to demonstrate the application of rules to create a dependency tree and correct the shape layout;

FIGS. 11A, 11B, and 11C are illustrative diagrams showing a shape layout before the layout has been corrected, a potential result of a layout corrective action resulting in a conflict, and a result of a conflict resolution action according to various embodiments presented herein, respectively;

FIGS. 12A, 12B, and 12C are illustrative diagrams showing a shape layout having an unconnected shape before the layout has been corrected, a potential result of a layout corrective action resulting in a conflict, and a result of a conflict resolution action according to various embodiments presented herein, respectively;

DETAILED DESCRIPTION

Figure 1A:
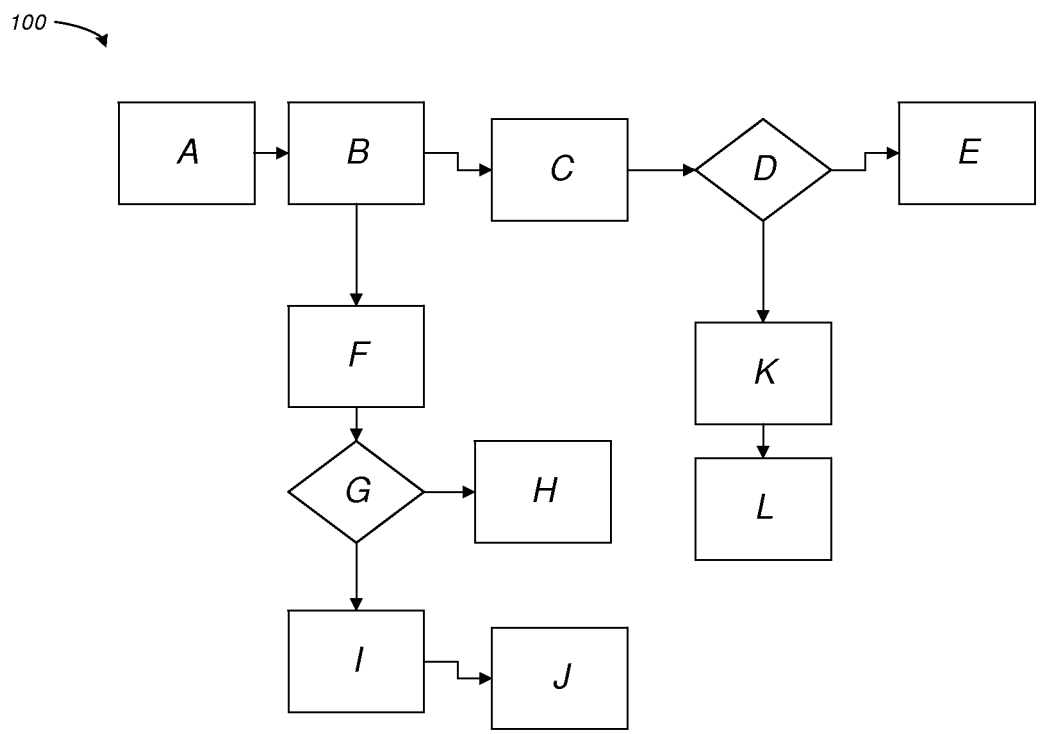
FIGS. 1A and 1B are illustrative diagrams showing a shape layout before spacing and alignment correction procedures have been performed and after spacing and alignment correction procedures have been performed, respectively, according to various embodiments presented herein.

The following detailed description is directed to technologies for adjusting the positions of shapes within a diagram. As discussed briefly above, users often spend considerable time cleaning up a diagram during and after its creation. Layout features exist in diagramming applications that attempt to assist a user in placing shapes. However, traditional automated shape layout features typically attempt to place shapes on a page according to a pre-defined template, without regard to the actual placement of shapes by the user. For example, a typical automated shape layout feature might pickup the diagram created by the user and re-arrange all of the shapes according to a pre-defined flowchart template, organizational chart template, or any other selected diagram type. The fact that the user placed a particular shape to the right of another shape instead of in another relative position is not taken into account and is not preserved in the resulting layout. As a result, the meaning associated with the diagram is often lost.

Aspects of the disclosure provided herein allow for the repositioning of shapes within a diagram to correct minor alignment and spacing discrepancies while maintaining the general layout created by the user. In the following detailed description, references are made to the accompanying drawings that form a part hereof, and which are shown by way of illustration specific embodiments or examples. Referring now to the drawings, in which like numerals represent like elements through the several figures, aspects of a computing system and methodology for correcting shape positioning within a diagram will be described.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

FIGS. 1A-3C provide various examples of diagrams before and after layout correction utilizing the concepts described herein. These examples will first be discussed as an illustrative overview of various applications of the disclosure provided herein. It should be noted that these examples are not exhaustive. Rather, the concepts discussed below may be applied to any shapes of any diagram to correct misalignment and/or uneven spacing issues.

Turning now to FIG. 1, a diagram 100 includes shapes A-L. The diagram 100 illustrates a typical diagram created by a user dragging and dropping shapes onto the page. After adding all of the desired shapes A-L and the corresponding connectors, the user has created the diagram 100 that includes unevenly spaced and misaligned shapes. For example, the space between shapes A and B is much less than the space between shapes B and C, as well as between shapes B and F. Similarly, while shapes A, B, and E are aligned along a horizontal axis, shapes C and D are offset from that axis. The result of the misalignment and uneven spacing is a diagram that is not as clean and professional as the user would typically desire. Traditionally, to "clean up" the diagram, the user would manually select shapes one at a time and nudge them up, down, left, and right until the spacing and alignment issues were corrected.

Figure 1B:
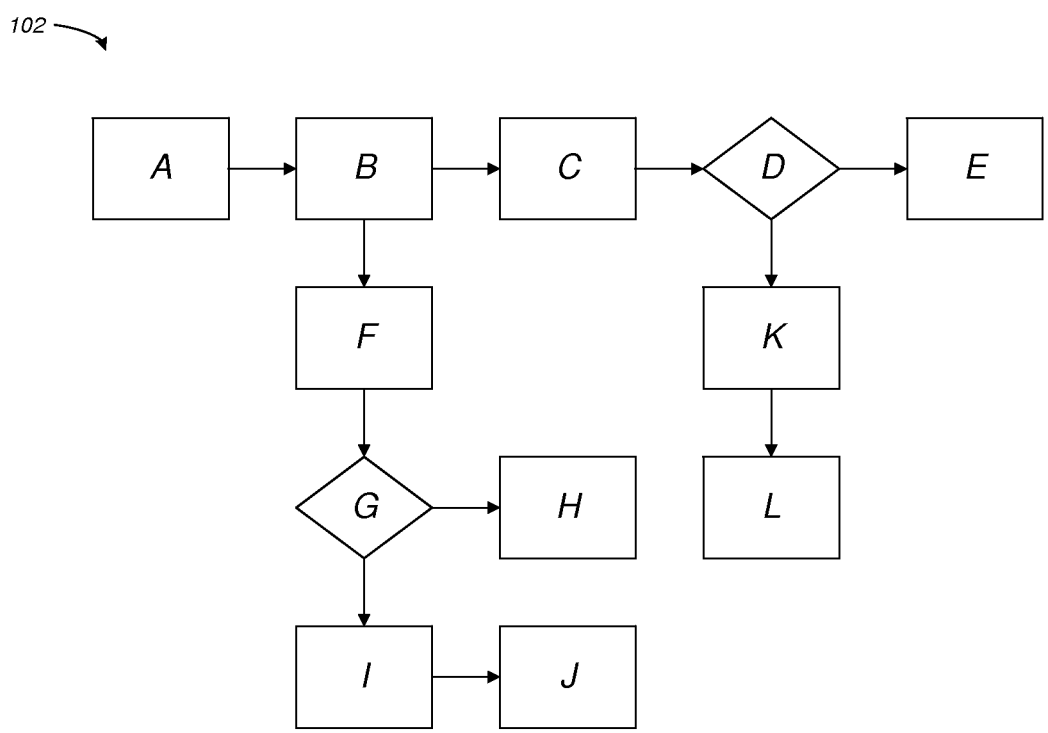

However, utilizing the embodiments described below, the user may select a single control that triggers a layout correction engine to apply one or more layout rules to reposition shapes within the diagram 100 to arrive at diagram 102, shown in FIG. 1B. Diagram 102 represents the corrected layout of diagram 100. As shown, the spacing between shapes A-L has been standardized and the shapes have been horizontally and vertically aligned. As will be described further below, the layout correction engine may be a diagramming application, a portion of a diagramming application, or any other application or module operative to perform the layout correction procedures described herein.

Figure 2A:
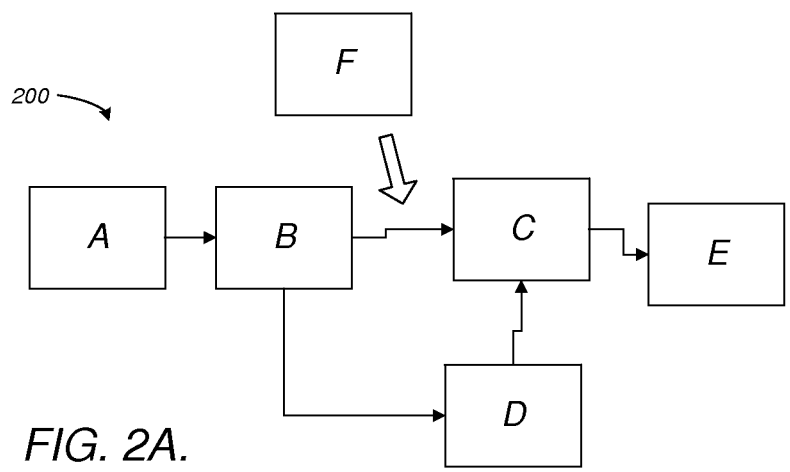
FIGS. 2A and 2B are illustrative diagrams showing a shape layout before a shape has been inserted into the diagram and after a shape has been inserted into the diagram, respectively, according to various embodiments presented herein.
Figure 2B:
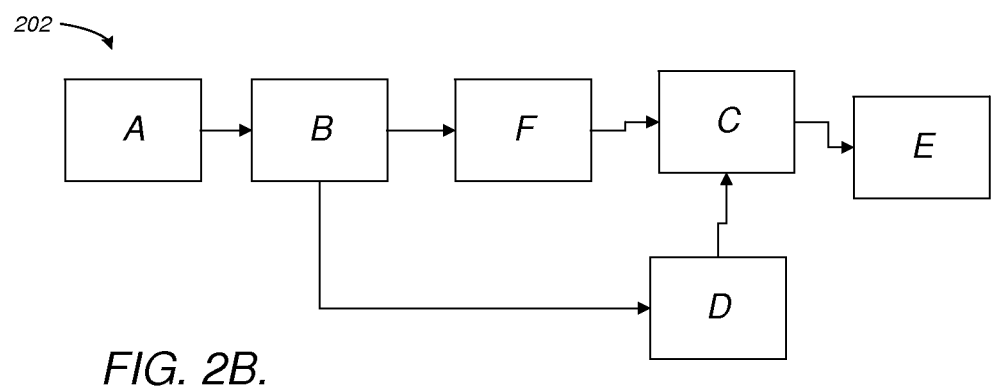

FIG. 2A shows an illustrative diagram 200 that includes shapes A-E. In this example, the user is inserting shape F into the diagram 200 between shapes B and C to create diagram 202 shown in FIG. 2B. Traditionally, the user would have to manually move shapes C, D, and E over to the right to make room for shape F, drop shape F into the created space, attach the connector between shapes B and C from shape B to shape F, and add another connector from shape F to shape C. However, utilizing the embodiments described herein, the user may simply drop shape F onto the connector between shapes B and C. This action triggers the layout correction engine to evenly space shape F from shape B, split the connector between shapes B and C as shown in FIG. 2B, and push shapes C, D, and E out to the right. It should be noted that the offsets, or relative positions between shapes in the original diagram 200, are maintained in diagram 202.

Alternatively, it should be appreciated that triggering the layout correction engine to reposition any shapes in a diagram through any requested action by the user may not only trigger the layout correction engine to perform the requested action (i.e., inserting a new shape), but also to reposition all of the shapes within the diagram to correct for misalignment and uneven spacing. In this alternative embodiment, inserting shape F into the diagram 200 would create a diagram similar to diagram 202, however all of the shapes A, B, F, C, and E would be realigned on a common horizontal axis and be evenly spaced apart, while shape D would be spaced an equivalent distance below shape C and be vertically aligned with shape C.

Figure 3A:
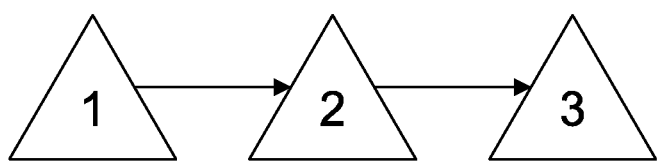
FIGS. 3A, 3B, and 3C are illustrative diagrams showing a shape layout before the diagram has been rotated, a potential result of a rotation action, and a result of a rotation action according to various embodiments presented herein, respectively.
Figure 3B:
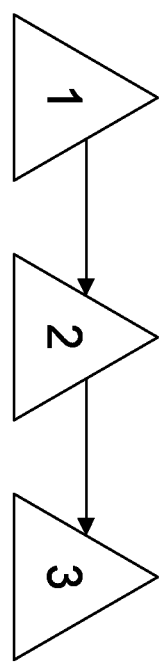
Figure 3C:
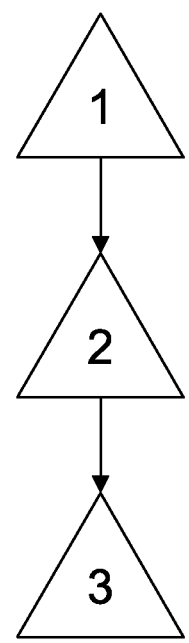

FIG. 3A shows an illustrative diagram 300 that includes shapes 1-3. There are often times in which a user would like to rotate a diagram, or portion of a diagram, to alter the orientation of the diagram without changing the orientation of the shapes. For example, diagram 302 of FIG. 3B shows a traditional result of rotating diagram 300. As seen in diagram 302, the shapes 1-3 and the corresponding text are rotated 90 degrees. However, the user may have desired to simply change the flow of the diagram from a left to right layout to a top to bottom layout. The disclosure described herein allows the user to rotate the diagram in a manner that alters the orientation, but not the individual shape configuration, as seen as diagram 304 in FIG. 3C.

Figure 4A:
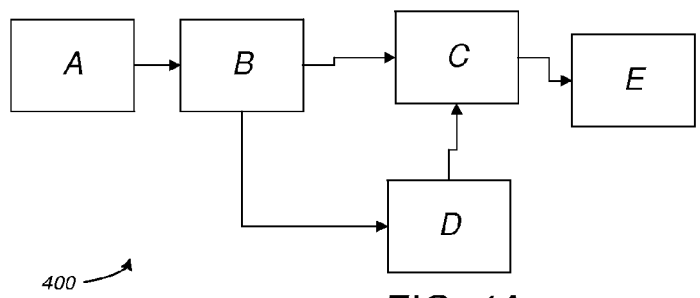
FIGS. 4A and 4B are illustrative diagrams showing a shape layout before spacing and alignment correction procedures have been performed and after spacing and alignment correction procedures have been performed, respectively, according to various embodiments presented herein.
Figure 4B:
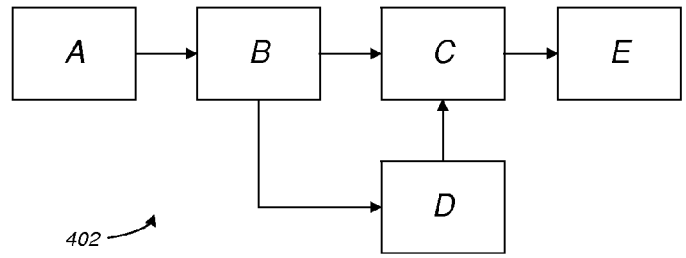

Having described some general concepts of the embodiments in context with the various layout correction requests shown in FIGS. 1A-3C, various aspects of the disclosure that allow the layout correction engine to alter the positions of shapes within a diagram will now be described. FIGS. 4A and 4B show pre-correction diagram 400 and corrected diagram 402. The corrected diagram 402 shows shapes A-E, properly aligned and evenly spaced, after the layout correction engine has modified the pre-correction diagram 400. According to various embodiments, the layout correction engine builds and utilizes a placement tree 500 and a dependency tree 600, shown in FIGS. 5 and 6, respectively. It should be noted that throughout this disclosure, the terms "placement tree 500" and "dependency tree 600" refer to any placement tree and dependency tree created and utilized according to the concepts described herein, such as those shown in FIGS. 5 and 6, and are not limited to the specific shapes and relationships of the embodiments shown in FIGS. 5 and 6.

In order to accurately reposition shapes within a diagram to correct layout issues while still preserving the user's original layout as closely as possible, the layout correction engine establishes relationships between the shapes, both from a parent-child perspective and from a relative position perspective. According to one embodiment, the placement tree 500 defines the parent-child relationships between the various shapes of the diagram. The placement tree 500 organizes the shapes in a parent-child manner such that each shape in the diagram appears only once in the placement tree 500 and has only one parent. In doing so, the layout correction engine resolves any ambiguity around multiple parents. For example, as seen in diagram 402, shape C has two parents, shapes B and D. The layout correction engine eliminates this ambiguity by selecting shape B as the parent of shape C, as seen in the placement tree 500.

If the diagram has loops, the layout correction engine will again resolve those loops so that each shape in the placement tree 500 has only one parent and the tree flows only downward or in a single direction. The layout correction engine will utilize a set of placement tree rules when creating the placement tree 500. These rules will assist the layout correction engine in choosing a single parent in a situation, such as that described above with respect to diagram 400, in which a shape has two or more incoming connectors, indicating more than one parent.

It should be appreciated that the placement tree rules may use any quantity and type of criteria for selecting a parent shape, including but not limited to shape characteristics, shape proximities, shape alignments, intervening shapes, and any other criteria. For example, the placement tree rules may guide the layout correction engine into selecting shape B of diagram 400 as the parent to shape C instead of shape D, since shape C is configured in-line with shapes B and E in the main diagram branch, while shape D is aligned below the main diagram branch.

In addition to establishing parent-child relationships, the placement tree 500 establishes an order in which a given shape's child shapes should be processed when repositioning shapes in a diagram. Similar to the determination discussed above as to which shape (shape B or shape D) to use as the parent of shape C, the layout correction engine utilizes the placement tree rules to determine the processing order of the two branches. For example, because shape C is part of the main diagram branch and has an associated child shape, shape E, the determination is made to process the branch of the placement tree 500 containing shape C prior to the branch of the placement tree 500 containing shape D.

For a connected diagram in which all shapes are connected to at least one other shape using a connector line, the connector lines are used to establish the parent-child relationships in the placement tree 500. However, there are often unconnected shapes within a diagram. One example includes text placed on the page to describe one or more shapes. According to one embodiment, for unconnected shapes, rules provide for a child relationship to be established from the nearest connected shape or from the nearest unconnected shape that already has a relationship defined in the placement tree 500. It should be appreciated that the rules may provide a limit as to how far an unconnected shape may be from another shape in order for the parent-child relationship to be established.

After creating the placement tree 500, according to one embodiment, the layout correction engine creates the dependency tree 600. According to embodiments provided herein, the layout correction engine positions shapes in a diagram utilizing each shape's offset, or relative position, from another shape that it depends on. The dependency tree 600 defines the positional dependency relationships between the various parent-child-sibling shapes established by the placement tree 500. The layout correction engine utilizes dependency tree rules to create the dependency tree 600 from the diagram. It should be appreciated that the dependency tree rules may use any quantity and type of criteria for determining which shape a given shape depends on for its positioning. As an example, according to one implementation, a shape is dependent on the closest parent or sibling that it virtually overlaps. When correcting a diagram layout, the layout correction engine will reposition each shape sequentially according to the dependency tree.

It should be noted that the placement tree 500 is used to resolve any ambiguity about parent-child relationships in the diagram. The dependency tree 600 is built using the placement tree 500 and defines the parent-child relationships within the diagram and their positional relationships, including the offsets that define where each shape is positioned with respect to another shape. When placing the shapes during a layout corrective action, the layout correction engine will step through the dependency tree 600 in order, placing shapes according to the relationships and offsets of the dependency tree 600. It should be appreciated that although this disclosure describes layout correction with respect to the creation and utilization of a placement tree 500 and a dependency tree 600, according to alternative embodiments, the layout correction engine may resolve parent-child ambiguity as the dependency tree 600 is created, without specifically creating the placement tree 500.

FIG. 7 illustrates virtual overlapping. Virtual overlapping occurs when one shape is within the axis-aligned extended edges of another shape. As seen in FIG. 7, shape A has horizontal overlap region 702 and vertical overlap region 704. Because shape B is located within the horizontal overlap region 702, shape B is considered to virtually overlap shape A. According to various embodiments, the boundaries of the overlap regions may be aligned to the edges of the shape, as shown in FIG. 7, or may be closer together or farther apart with respect to the edges of the shape according to a predetermined tolerance.

According to one illustrative implementation, if a shape does not virtually overlap its parent or siblings, then if the shape is closer to or the same distance from its nearest sibling than to its parent and that sibling is closer to or the same distance from the parent than the shape is, then the shape is dependent on the sibling. Otherwise, the shape is dependent on its parent. It should be noted that shapes may be positionally dependent on siblings or parents. The manner in which shapes are connected in the diagram is not central to the creation of the dependency tree. In fact, various embodiments allow connected shapes to be dependent on unconnected shapes for positioning purposes.

FIGS. 8A and 8B illustrate layout correction according to one embodiment that utilizes the dependency tree rule described above. Looking at FIG. 8A, shape B virtually overlaps shape A along a vertical axis. Because shape B is the closest child to shape A and shape B virtually overlaps its parent shape A, shape B is aligned with shape A, as seen in FIG. 8B. Shape C is aligned to shape B since they virtually overlap along a horizontal axis. Similarly, shape D is aligned to shape B since they virtually overlap along a horizontal axis. Because all children are below the parent, they are top aligned.

After creating the placement tree 500 and the dependency tree 600, the layout correction engine utilizes the dependency tree 600 when applying the layout rules to correct the diagram layout per the request from the user. Given the dependency tree 600, the layout correction engine can determine how to move child shapes to follow their parent shapes when the parent shapes are repositioned, and when a given shape is repositioned, what other shape to compare its position to in order to determine exactly where to place it in the diagram.

Figure 5:
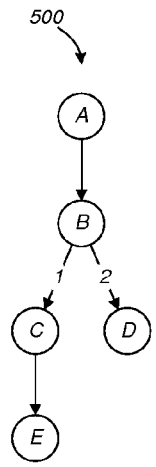
FIGS. 5 and 6 are illustrative examples of a placement tree and a dependency tree, respectively, corresponding to the diagrams shown in FIGS. 4A and 4B according to various embodiments presented herein.
Figure 6:
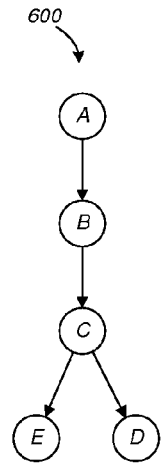

As an example, when correcting the alignment and spacing of shapes A-E in diagram 400 of FIG. 4A, the layout correction engine creates the placement tree 500 and the dependency tree 600 shown in FIGS. 5 and 6, respectively. The layout correction engine begins repositioning the shapes in order according to the dependency tree 600. First, shape B is evenly spaced from shape A and properly aligned. Doing so may move shape B to the right slightly as seen in the corrected layout of diagram 402. The dependency tree 600 contains the offset from shape B to shape C. It should be understood that the layout correction engine may calculate the offset of each shape within the diagram with respect to the shape from which it depends and store that information as part of the dependency tree 600 or separately from the dependency tree 600. Because the offset of shape C from shape B is known, the act of moving shape B does not alter shape C's relative position to shape B. In effect, shape C follows shape B when shape B is repositioned.

According to one embodiment, when shape C follows shape B, all other shapes in the dependency tree 600 that are subordinate to shape B, specifically shapes C-E, follow shape B as well using the calculated offsets from the dependency tree 600. Continuing down the dependency tree 600, the layout correction engine next repositions shape C. Shape C is repositioned prior to shape D, since when creating the placement tree 500, the layout correction engine determined that the branch containing shape C should be processed prior to the branch containing shape D. The order is designated in the placement tree 500 as "1" and "2." Shape C is then repositioned in alignment with and evenly spaced from shape B, which moves it down and to the left as shown in FIG. 4B. According to the dependency tree 600, shapes D and E rely on shape C for their positions, so they effectively follow shape C using the calculated offsets in the dependency tree 600.

Shape E is repositioned in alignment with and evenly spaced from shape C. Finally, it should be noted that according to the placement tree 500, shape D's parent is shape B. However, when building the dependency tree 600, it was determined that shape D's position is dependent on shape C. During dependency tree 600 calculation, the layout correction engine determined that shape D was closer to shape C and nearly lined up with shape C, so the determination was made that shape D's position is more related to shape C than to its parent, shape B. As a result, shape D is aligned with and evenly spaced from shape C, but in the same general direction as it was located in diagram 400, specifically below shape C. This information is available to the layout correction engine from the offset in the dependency tree 600 and is used to preserve the original layout configuration created by the user.

It should be understood that the principles described above with respect to correcting diagram layouts by creating and utilizing the placement tree 500 and the dependency tree 600 may be applied to repositioning diagram shapes while responding to a user request to modify the diagram, as discussed above with respect to FIGS. 1A-3C. For example, turning back to FIGS. 2A and 2B, when the user inserts shape F into the diagram 200, the layout correction engine pushes shape C over to the right to make room for shape F. When moving shape C to the right, all of the subordinate shapes, specifically shapes D and E, follow shape C to the right. The calculated offsets from the dependency tree 600 are utilized to ensure that shapes D and E are each positioned in the same location with respect to shape C as they were positioned in diagram 200. For shape F, if the layout correction engine determines that shape F is a child of shape B, then shape F will be spaced and aligned from shape B and shape C will become a new child of shape F. Accordingly, the offset of shape C from shape F will be maintained as it was originally offset from shape B.

According to another implementation, when shape F is inserted into the diagram 200, the layout correction engine determines whether there is room to evenly space shape F from shape B without conflicting with shape C. If there is room, then shape F will be inserted without moving shape C and any subordinate shapes and the connectors will be modified as described above. However, if the layout correction engine determines that shape C must be moved to make room for shape F, then shape C would be evenly spaced from shape F and the corresponding subordinate shapes would be moved as described above.

According to one implementation, shape C must depend on shape B when the dependency tree 600 is created in order to insert shape F between. The shapes between which the new shape will be inserted must depend on one another. Therefore, if shape F were inserted between shapes B and D, then a different dependency tree 600 would have to be created to ensure proper spacing and alignment of shape F from shape B and of shape D from shape F.

Similarly, just as the placement tree 500 and the dependency tree 600 creation and utilization allows for diagram layout correction upon the insertion of a new shape, the layout correction engine may utilize the placement tree 500 and the dependency tree 600 to flip or rotate diagrams as described above with respect to FIGS. 3A-3C. For example, when the layout correction engine applies a layout rule associated with rotating a diagram 90 degrees, the offsets from the dependency tree 600 are maintained, only shifted 90 degrees to reposition the shapes as requested. In this manner, the diagram may be altered to change flow directions without affecting the general positioning of the shapes with respect to one another.

Figures 9A, 9B:
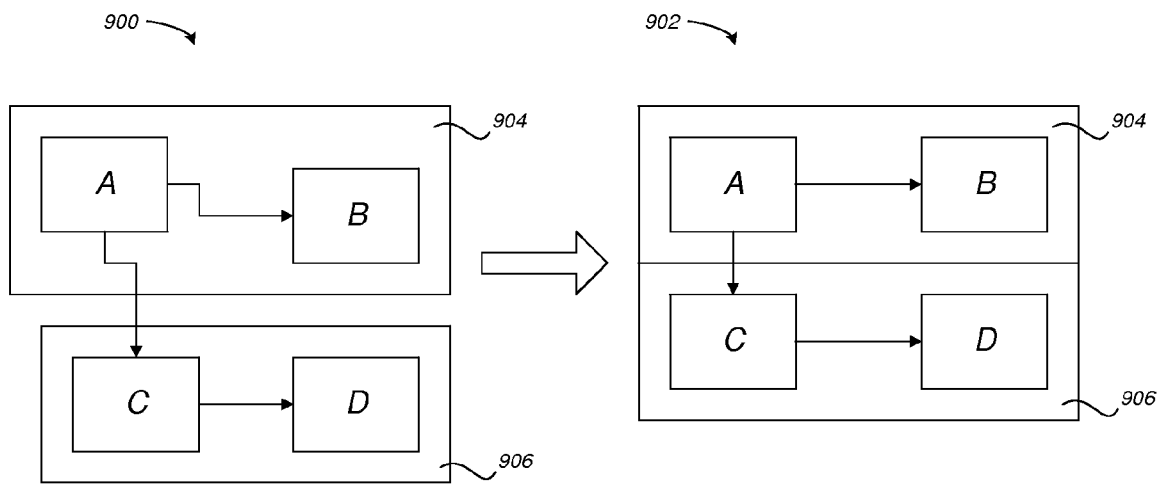
FIGS. 9A and 9B are illustrative diagrams showing a shape layout that includes multiple shape regions before spacing and alignment correction procedures have been performed and after spacing and alignment correction procedures have been performed, respectively, according to various embodiments presented herein.

Diagramming applications may allow for the grouping of shapes into regions. One example of a region is a container. Containers and other constrained regions may be identified by a box or other boundary surrounding the member shapes or via any other means for visually identifying a group of shapes. It is typically important that the region membership, or group of shapes assigned to the region, is preserved. It would not be desirable for a member shape to be repositioned outside of the region boundaries or for a non-member shape to be repositioned inside of the region boundaries. FIGS. 9A and 9B show before and after correction diagrams 900 and 902, respectively, which illustrate how aspects of the disclosure may be applied to shapes within regions and with regions themselves.

For example, creating and applying the placement tree and dependency tree concepts described above to the shapes A-D of diagram 900, the layout correction engine aligns shapes A and B within the region 904, and then aligns shapes C and D to shapes A and B. According to various embodiments, regions attempt to follow the repositioning of shapes within the regions. In many cases, as shown in FIGS. 9A and 9B, adjusting regions to correspond with the repositioning of member shapes within is not a problem. The region 906 is expanded, aligned, and spaced with respect to region 904 to accommodate the repositioning of shape C. Region 904 is reduced in height as a result of aligning shape B to shape A. It should be appreciated that the layout rules may be established to correct the layout in any number of ways. For example, the shapes B and D could have been adjusted such that they are evenly spaced with shapes A and C in the same manner that shape C is spaced from shape A. Additionally, the regions 904 and 906 may be positioned by the layout correction engine so that they remain spaced apart or so that they abut one another as shown.

Figure 10A:
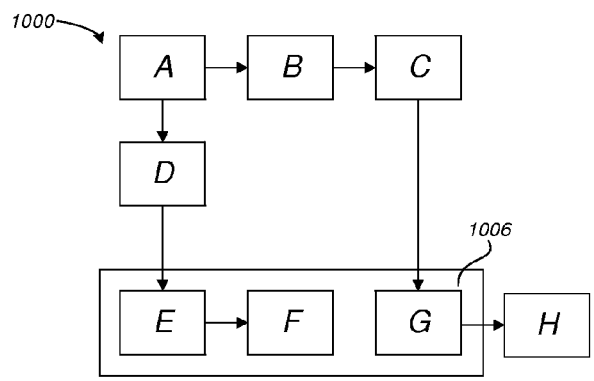
FIGS. 10A, 10B, and 10C are illustrative diagrams showing a shape layout that includes a shape region before the layout has been corrected, a potential result of a layout corrective action, and a result of a layout corrective action according to various embodiments presented herein, respectively.
Figure 10B:
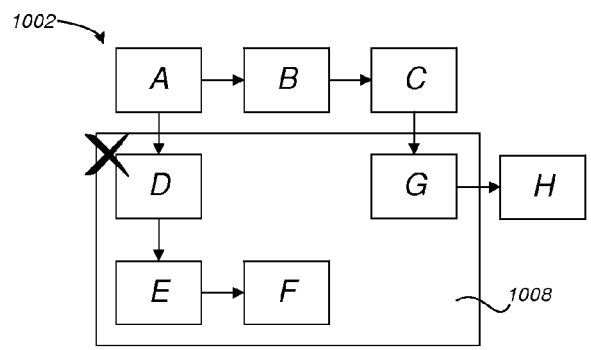
Figure 10C:
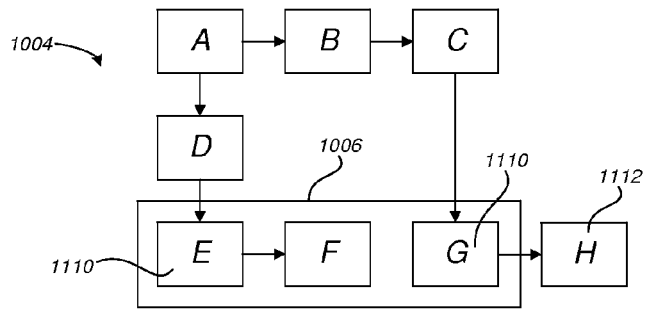

There are situations in which simply moving and resizing the region to accommodate repositioning of member shapes within does not provide a desirable outcome. Turning to FIGS. 10A-10C, an illustrative example of correcting the layout of a diagram 1000 containing a region 1006 will be described. FIG. 10A shows the diagram 1000. The diagram 1000 has a region 1006 that contains member shapes E, F, and G. The user would like to correct the layout of the diagram 1000 to adjust the spacing between the shapes A-H. If the layout correction engine adjusted diagram 1000 to set even spacing, then shapes E and G might move closer to their parents, shapes D and C, respectively. It should be clear that if the dependency tree 600 created a dependency between shapes F and G, then shape G would not be repositioned closer to its parent shape C. However, because shapes F and G do not have a sibling relationship that would create a dependency of one shape on the other, according to one implementation, shape G is evenly spaced from shape C as shown in FIG. 10B. Doing so might extend the boundaries of the region 1006 upward to follow shape G, creating region 1008. This is an undesirable result since extending the boundaries of region 1006 to create region 1008 would now introduce shape D into the region 1008. Shape D is not a member of the region 1006 and should not be added to the region membership to create a new region 1008.

FIG. 10C shows diagram 1004, which is the desired outcome of a layout corrective action taken on diagram 1000. According to various embodiments, the layout correction engine ensures the outcome shown in FIG. 10C through an ongoing analysis of shapes and regions to perform region corrections as shapes are placed while traversing the dependency tree 600. In order to manage shape movement between shapes that are inside and outside the boundaries of a region and ensure that region membership is preserved, the layout correction engine identifies two types of shapes that affect the position of the region's boundaries.

The first type of shape is an entry node 1110. An entry node 1110 is a shape in the region whose parent shape is outside the region. Entry nodes 1110 have an associated entry direction that is determined according to the offset between the entry node 1110 and its parent. In diagram 1004, shapes E and G are entry nodes 1110 for the top boundary of the region 10006 since shapes E and G are positioned below parent shapes D and C, respectively. The second type of shape that affects the position of the region's boundaries is an exit node 1112. Exit nodes 1112 are shapes outside the region whose parent shapes are inside the region. In diagram 1004, shape H is an exit node 1112 since it is located outside of the region 1006 while its parent shape, shape G, is within the boundaries of the region 1006.

When traversing the dependency tree 600 and repositioning shapes, the size of a region and its boundaries are considered undetermined until an entry node 1110 is placed. When the layout correction engine places an entry node 1110, the layout correction engine calculates the size and position of the boundaries based on the entry nodes 1110, the parents of the exit nodes 1112, and the layout correction of the member shapes within. Once the boundaries of the region have been determined, the layout correction engine locks or otherwise fixes the boundaries.

The layout correction engine attempts to maintain the boundaries of the regions as compactly laid out as possible. To do so, excess movement of the boundaries is restricted. The layout correction engine identifies and tracks the entry nodes 1110 and exit nodes 1112, along with the size of their sub-trees, or set of shapes subordinate to a given shape. To determine the position of the top boundary of a region, the top boundary is placed at the lowest position that allows entry nodes 1110 entering from the top to be within the region and exit nodes 1112 leaving the top boundary to be outside the region. Doing so may not leave sufficient room for the shapes inside the region to all fit within the region. In these situations, the opposing boundary, which in this scenario is the bottom boundary, is adjusted to be a fixed distance from the top boundary that allows enough room inside the region to accommodate its member shapes.

It should be understood that an entry node 1110 can be offset from its parent in two directions. The entry node 1110 may only be considered an entry node 1110 for one side of the region. As an example, if in diagram 1000, shape D were more to the left, shape E could be an entry node for either the top or left boundaries since it would be offset down and to the right from shape D. In this situation, the layout correction engine calculates outcomes for both possibilities and selects the one that leaves the shapes with the least overall deviation from the original dependency tree 600. Doing so represents the smallest change in the relative offsets between parents and children.

Turning now to FIGS. 11A-12C, conflict resolution will be discussed. When shapes are repositioned to comply with the layout correction request from the user, it is possible that one or more repositioned shapes may overlap one or more other shapes or areas in the diagram, such as a page break, where placement is not desirable. When this occurs, the disclosure provided herein provides the layout correction engine with a set of conflict resolution rules to aid in further repositioning shapes to avoid overlap. The layout correction engine attempts to nudge or otherwise reposition the conflicting shape or region as little as possible to avoid the conflict while preserving the overall diagram layout intended by the user. According to one embodiment, the layout correction engine utilizes the established parent-child relationships and the calculated offset of the child from its parent to determine a direction in which the applicable portion of the diagram is flowing. The intention is to push the conflicting shape out in the general direction in which that part of the diagram flows. It should be appreciated that embodiments provide a threshold limit corresponding to how far out a shape may be pushed before looking for available space in an alternative direction.

FIG. 11A shows a diagram 1100 that has not been subjected to layout corrective actions by the layout correction engine. After repositioning shapes in an effort to evenly space the shapes in the diagram 1100, one implementation results in diagram 1102 shown in FIG. 11B. Diagram 1102 includes two shape conflicts. The first conflict occurs at the location in which shape B1 overlaps shape D. The second conflict occurs at the location in which shape B2 overlaps shape D1. One solution to the conflict would be to independently moves shapes D and D1. However, moving these shapes independently would have the negative effect of breaking up the diagram and altering the layout in a manner that is presumably not consistent with the original intent of the user. Therefore, when resolving conflicts, the conflict resolution rules instruct the layout correction engine to attempt to move the conflicting shape and its first level of children together. FIG. 11C shows diagram 1104, which results from moving conflicting shape D and children D1-D3 together. The result is a diagram 1104 that is neatly spaced and aligned, while maintaining the general layout configuration of the original diagram 1100.

According to various embodiments, the conflict resolution rules allow for shapes to interleave one another in order to best utilize the available diagram space, which may minimize the distance that one or more shapes must be moved to resolve a conflict. FIG. 12A shows a diagram 1200 in which an unconnected shape is positioned between shapes C1 and C2. FIG. 12B shows one possible result, diagram 1202, when layout corrections are made to diagram 1200 according to the disclosure herein, which evenly spaces shapes B and C from shape A. In diagram 1202, shapes C1 and C2 overlap shape B and the unconnected shape originally positioned between shapes C1 and C2 to create two conflicts. FIG. 12C shows one possible resolution in which shapes C1 and C2 are allowed to interleave with the unconnected shape.

It should be understood that according to various embodiments of the disclosure provided herein, unconnected shapes may or may not participate in layout corrections. According to the embodiment shown in FIGS. 12A-12C, the unconnected shape is not repositioned during layout correction procedures. However, according to an alternative embodiment, the unconnected shape may have been treated as a child of shape C via a virtual connection and dependent upon shape C1 or C2 for positioning when the placement tree 500 and dependency tree 600 were built by the layout correction engine. In this implementation, the unconnected shape may have been repositioned along with shapes C1 and C2 in diagram 1202 such that the offset between the unconnected shape and shape C1 or C2 from which it depends remained the same. Of course, the conflict between shapes C1 and B would still have remained and required resolving.

Figure 13A:
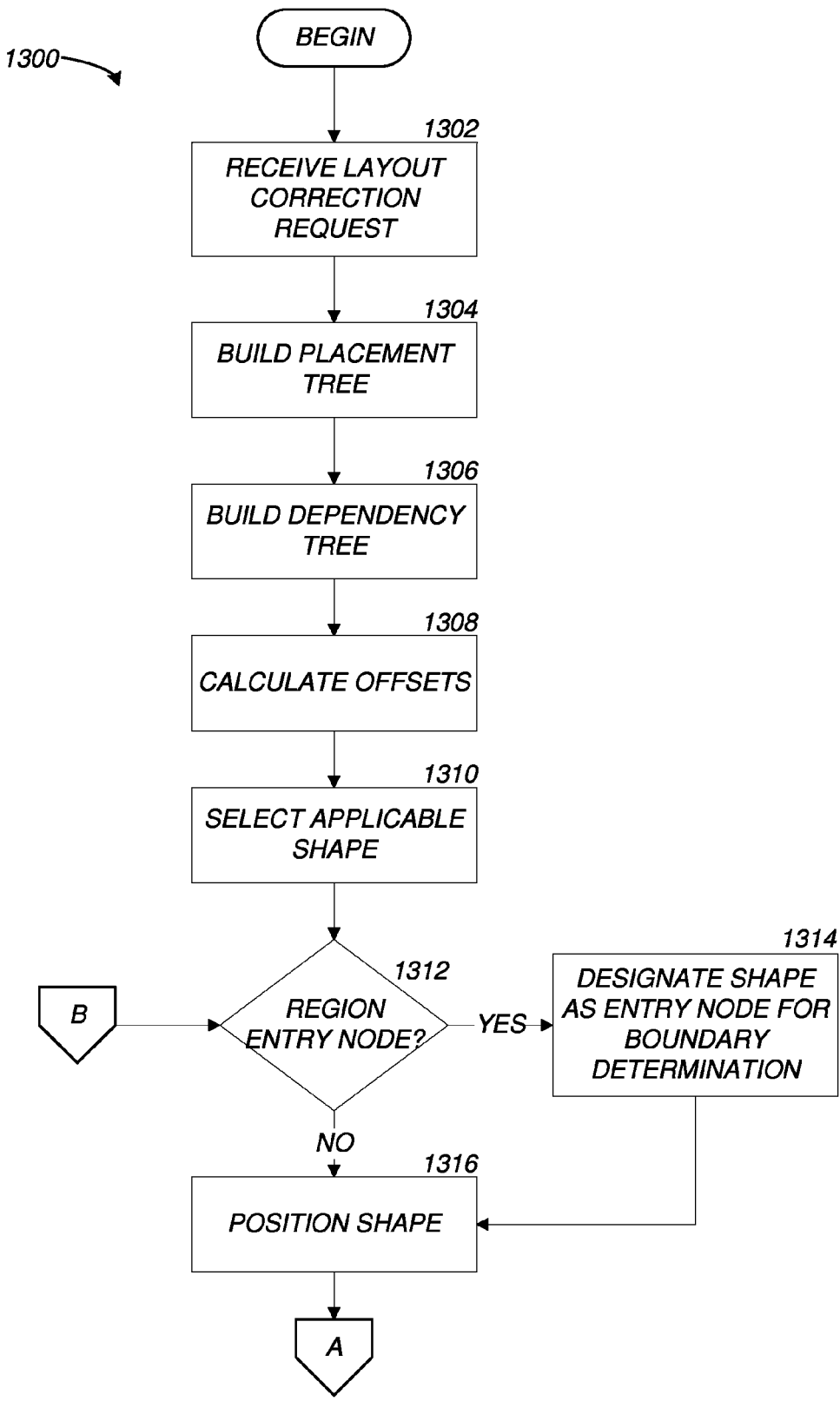
FIGS. 13A and 13B are flow diagrams showing an illustrative process for correcting the positions of shapes in a diagram according to various embodiments presented herein.
Figure 13B:
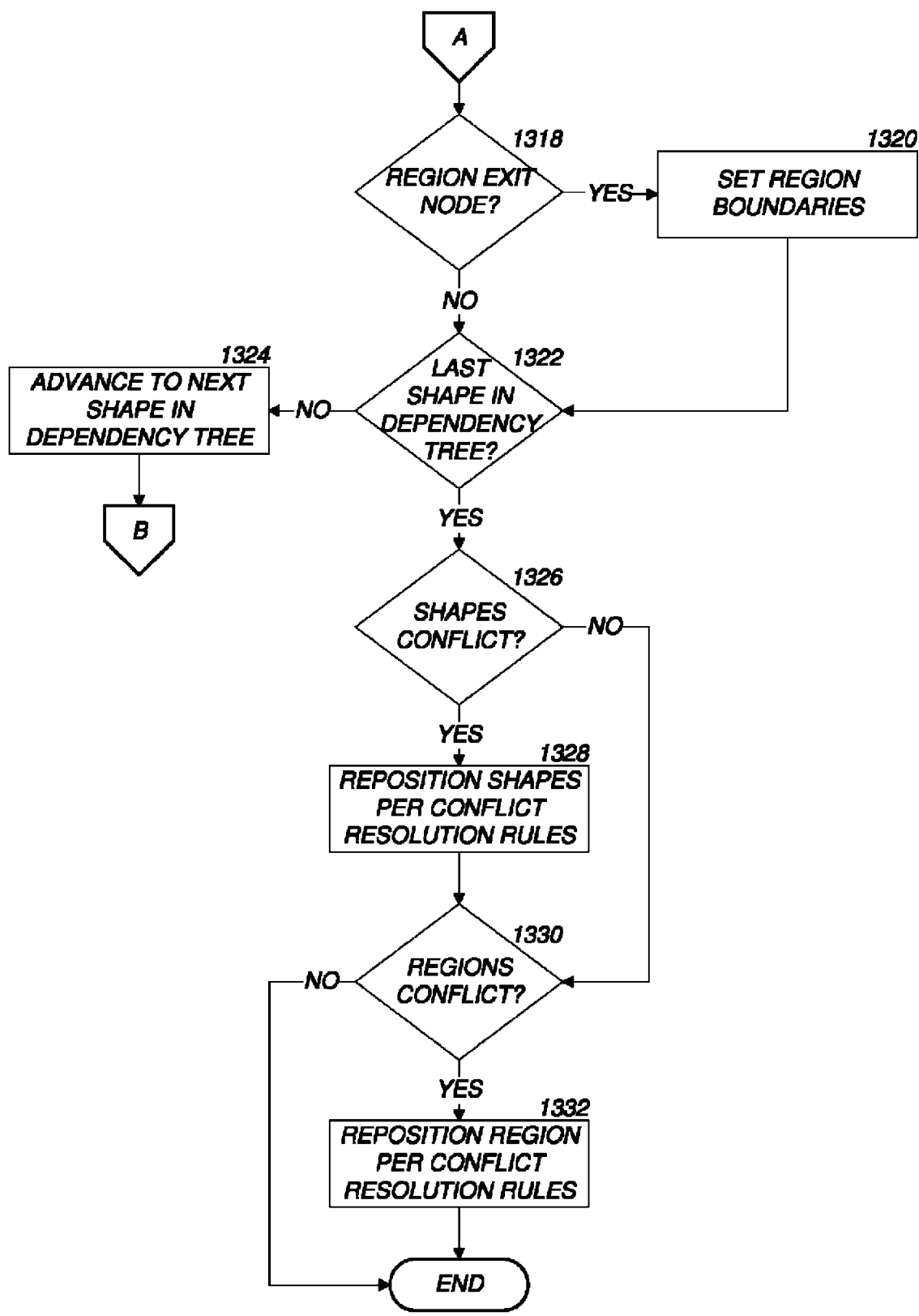

Referring now to FIGS. 13A and 13B, additional details will be provided regarding the embodiments presented herein for correcting positions of shapes in a diagram. In particular, FIGS. 13A and 13B show a flow diagram illustrating aspects of the operation of the layout correction engine in performing layout corrections according to the disclosure provided herein. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system.

Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 1300 begins at operation 1302, where the layout correction engine receives a layout correction request from the user. As discussed above, this request may be triggered from the user's selection of a control via a user interface or may be triggered from an action taken by the user when building or editing a diagram (i.e. inserting a shape). From operation 1302, the routine 1300 continues to operation 1304, where the layout correction engine creates the placement tree 500 that resolves any ambiguity in establishing parent-child relationships amongst the shapes in the diagram. The routine 1300 continues to operation 1306, where the layout correction engine creates the dependency tree 600 that establishes positional relationships between shapes.

From operation 1306, the routine 1300 continues to operation 1308, where the layout correction engine calculates the offsets of each shape from their corresponding dependent shapes according to the dependency tree 600. It should be appreciated that this operation may occur during the creation of the dependency tree 600 and stored as a part of the dependency tree 600. The routine 1300 continues from operation 1308 to operation 1310, where the layout correction engine selects the first shape from the dependency tree 600 that will require repositioning. At operation 1312, the layout correction engine determines whether the selected shape is an entry node 1110 of a region. If the selected shape is an entry node 1110, then the routine 1300 proceeds to operation 1314, where the layout correction engine designates the shape as such to be used in setting the region boundaries as discussed above. From operation 1314, the routine continues to operation 1316 and continues as described below.

If at operation 1312, the layout correction engine determines that the selected shape is not an entry node 1110, then the routine proceeds to operation 1316, where the layout correction engine positions the shape according to the layout rules. As described in detail above, positioning the shape includes utilizing the dependency tree 600 to determine the positional offset of a shape from another shape from which it depends. The routine 1300 continues from operation 1316 to operation 1318, where the layout correction engine determines whether the shape is an exit node 1112. If the shape is an exit node 1112, then the routine 1300 proceeds to operation 1320, where the layout correction engine sets and locks the region boundaries around the entry node 1110, the parent of the exit node 1112, and any intervening member shapes. As described above, the layout correction engine may attempt to minimize the region's boundaries. The routine 1300 then continues to operation 1322 from operation 1320 and proceeds as described below.

However, if at operation 1318, the layout correction engine determines that the selected shape is not an exit node 1112 of a region, then the routine 1300 proceeds to operation 1322, where the layout correction engine determines whether the selected shape is the last shape in the dependency tree 600. If the selected shape is not the last shape in the dependency tree 600, then the routine 1300 proceeds to operation 1324, where the layout correction engine advances to the next shape in the dependency tree 600 and the routine 1300 returns to operation 1312 and continues as described above. However, if at operation 1322, the layout correction engine determines that the selected shape is the last shape in the dependency tree 600, then the routine 1300 proceeds to operation 1326, where the layout correction engine determines if there are any conflicts. As described above, conflicts may arise when one or more shapes or regions overlap and when a shape or region overlaps a page break. It should be appreciated that the conflict resolution rules may define any type of layout characteristic as a conflict and provide logic as to how the conflict is to be resolved.

If the layout correction engine determines that none of the repositioned shapes create a conflict, then the routine 1300 proceeds to operation 1330 and continues as described below. However, if at operation 1326, the layout correction engine determines that one or more repositioned shapes create a conflict, then the routine 1300 proceeds to operation 1328, where the layout correction engine repositions one or more shapes according to the conflict resolution rules. From operation 1328, the routine 1300 continues to operation 1330, where the layout correction engine determines whether there is a conflict corresponding to or within any regions. If there is not a region conflict, then the routine 1300 ends.

However, if the layout correction engine determines that there is a region conflict, then the routine 1300 proceeds to operation 1332, where the layout correction engine repositions one or more regions, or shapes within one or more regions, according to the conflict resolution rules. As described above, according to various embodiments, regional boundaries and shape membership issues are resolved during the shape placement process, which eliminates or minimizes conflicts of these types after the layout corrections have been made. For this reason, most region conflicts will occur as a result of a region overlapping a shape or from a shape overlapping a region after the layout corrections. After resolving the region conflicts at operation 1332, the routine 1300 ends.

Figure 14:
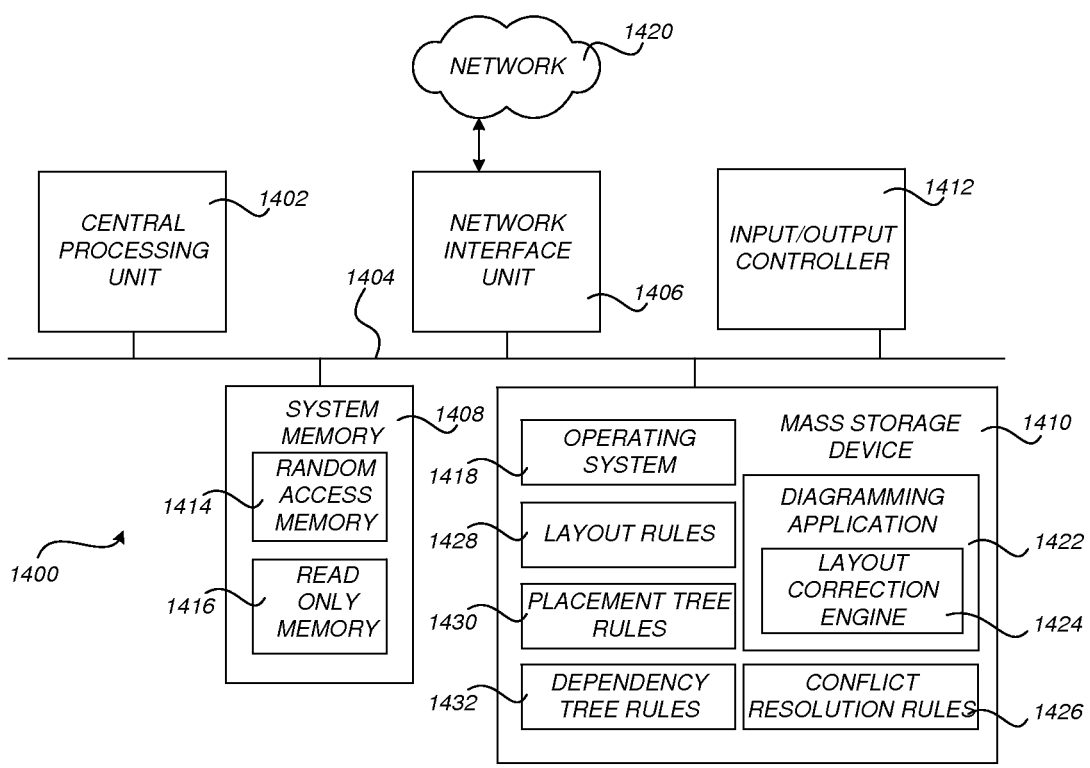
FIG. 14 is a computer architecture diagram showing an illustrative computer hardware and software architecture for a computing system capable of implementing aspects of the embodiments presented herein.

FIG. 14 shows an illustrative computer architecture for a computer 1400 capable of executing the software components described herein for correcting the positions of shapes in a diagram in the manner presented above. The computer architecture shown in FIG. 14 illustrates a conventional desktop, laptop, or server computer and may be utilized to execute any aspects of the software components presented herein.

The computer architecture shown in FIG. 14 includes a central processing unit 1402 ("CPU"), a system memory 1408, including a random access memory 1414 ("RAM") and a read-only memory ("ROM") 1416, and a system bus 1404 that couples the memory to the CPU 1402. A basic input/output system containing the basic routines that help to transfer information between elements within the computer 1400, such as during startup, is stored in the ROM 1416. The computer 1400 further includes a mass storage device 1410 for storing an operating system 1418, application programs, and other program modules, which are described in greater detail herein.

The mass storage device 1410 is connected to the CPU 1402 through a mass storage controller (not shown) connected to the bus 1404. The mass storage device 1410 and its associated computer-readable media provide non-volatile storage for the computer 1400. Although the description of computer-readable media contained herein refers to a mass storage device, such as a hard disk or CD-ROM drive, it should be appreciated by those skilled in the art that computer-readable media can be any available computer storage media that can be accessed by the computer 1400.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 1400.

According to various embodiments, the computer 1400 may operate in a networked environment using logical connections to remote computers through a network such as the network 1420. The computer 1400 may connect to the network 1420 through a network interface unit 1406 connected to the bus 1404. It should be appreciated that the network interface unit 1406 may also be utilized to connect to other types of networks and remote computer systems. The computer 1400 may also include an input/output controller 1412 for receiving and processing input from a number of other devices, including a keyboard, mouse, or electronic stylus (not shown in FIG. 14). Similarly, an input/output controller may provide output to a display screen, a printer, or other type of output device (also not shown in FIG. 14).

As mentioned briefly above, a number of program modules and data files may be stored in the mass storage device 1410 and RAM 1414 of the computer 1400, including an operating system 1418 suitable for controlling the operation of a networked desktop, laptop, or server computer. The mass storage device 1410 and RAM 1414 may also store one or more program modules. In particular, the mass storage device 1410 and the RAM 1414 may store a diagramming application 1422, the layout correction engine 1424, the conflict resolution rules 1426, the layout rules 1428, the placement tree rules 1430, and the dependency tree rules 1432, each of which was described in detail above. The mass storage device 1410 and the RAM 1414 may also store other types of program modules.

Based on the foregoing, it should be appreciated that technologies for correcting diagram layouts are provided herein. Utilizing the concepts disclosed above, a user will be able to enjoy multi-directional alignment and spacing of shapes in a diagram. The layout correction processes may occur automatically as the diagram is built or edited, through the selection of a single control, or through a minimal combination of controls, rather than requiring the user to manually nudge shapes around the diagram in an effort to clean up misalignments and uneven spacing. By repositioning shapes according to the current layout and offset between shapes, the embodiments provided herein can make minor corrections without destroying the general layout as created by the user.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for correcting a position of a shape within a diagram comprising a plurality of shapes, the method comprising:
    receiving a layout correction request;
    creating a dependency tree that defines parent and child relationships between the plurality of shapes and associations between the plurality of shapes according to physical positions of the plurality of shapes in the diagram by, for each shape of the plurality of shapes, determining whether the shape virtually overlaps a parent or a sibling;
        if the shape virtually overlaps the parent or a sibling, then determining that the shape is dependent on a closest parent or sibling that the shape virtually overlaps; and
        if the shape does not virtually overlap the parent or a sibling, then determining whether the shape is closer to or an equivalent distance from a nearest sibling than to the parent while the nearest sibling is closer to or an equivalent distance from the parent than the shape is;
        if so, then determining that the shape is dependent on the nearest sibling; and
        if not, then determining that the shape is dependent on the parent;
    determining a positional relationship between the plurality of shapes based on a current layout of the plurality of shapes;
    determining positional offsets between each of the plurality of shapes and a corresponding dependent shape according to the associations defined by the dependency tree; and
    repositioning the shape to a new location within the diagram according to layout rules corresponding to the layout correction request, the positional relationship between the plurality of shapes, and the positional offsets between each of the plurality of shapes and the corresponding dependent shape, the layout rules comprising instructions for positioning the plurality of shapes to comply with the layout correction request.

2. The method of claim 1, wherein the layout correction request comprises a request to correct alignment and spacing between at least a portion of the plurality of shapes.

3. The method of claim 1, wherein the layout correction request comprises a request to insert a new shape into the diagram.

4. The method of claim 1, wherein the layout correction request comprises a request to rotate or flip at least a portion of the diagram.

5. The method of claim 1, further comprising:
    identifying a conflict associated with the shape at the new location; and
    repositioning at least one shape of the plurality of shapes according to a conflict resolution rule corresponding to the conflict.

6. An apparatus comprising:
    a processor; and
    a computer storage medium having computer executable instructions stored thereon which, when executed by the processor, cause the processor to:
    receive a layout correction request to alter a layout of a plurality of shapes in a diagram;
    create a dependency tree that defines parent and child relationships between the plurality of shapes and associations between the plurality of shapes according to physical positions of the plurality of shapes in the diagram;
    determine a positional offset for each shape from a corresponding shape according to the associations defined by the dependency tree;
    sequentially reposition at least a subset of the plurality of shapes in the diagram according to the dependency tree and at least one layout rule corresponding to the layout correction request;
    before a shape is repositioned, determine whether the shape is an entry node to a region with a parent shape outside the region;
    if the shape being repositioned is an entry node to the region, set region boundaries prior to repositioning a shape outside of the region; and
    if the shape being repositioned is not an entry node to the region, continue sequential repositioning of the subset of the plurality of shapes.

7. The apparatus of claim 6, wherein the layout correction request comprises at least one of a request to correct alignment between a portion of the plurality of shapes, a request to correct spacing between a portion of the plurality of shapes, a request to insert a new shape into the diagram, a request to rotate a portion of the diagram, and a request to flip a portion of the diagram.

8. The apparatus of claim 6, wherein each shape in the diagram appears once in the dependency tree, has no more than one parent, and if associated with more than one child shape, designates an order in which each child shape is to be repositioned during a layout correction.

9. The apparatus of claim 8, wherein unconnected shapes in the diagram appear in the dependency tree as a child shape of a closest connected shape or of a closest unconnected shape.

10. The apparatus of claim 6, wherein causing the computer to create the dependency tree comprises causing the computer to determine whether a shape virtually overlaps another shape in the diagram.

11. The apparatus of claim 6, wherein causing the computer to sequentially reposition at least a subset of the plurality of shapes in the diagram according to the dependency tree and at least one layout rule corresponding to the layout correction request comprises causing the computer to navigate sequentially through the dependency tree and for each shape:
    reposition the shape according to the at least one layout rule; and
    reposition all subordinate shapes according to the dependency tree and the positional offset of each subordinate shape from a dependent shape.

12. The apparatus of claim 6, wherein causing the computer to set region boundaries comprises identifying all entry nodes and exit nodes associated with the region and setting the region boundaries around the entry nodes and the parent shapes of the exit nodes such that the entry nodes and parent shapes of the exit nodes are within the region boundaries and the exit nodes are outside of the region boundaries.

13. The apparatus of claim 6, further comprising computer executable instructions stored thereon which, when executed by a computer, cause the computer to:

identify a conflict associated with a repositioned shape; and reposition at least one shape of the plurality of shapes according to a conflict resolution rule corresponding to the conflict.

14. An apparatus comprising:

a processor; and a computer storage medium having computer executable instructions stored thereon which, when executed by the processor, cause the processor to:

receive a layout correction request to alter a layout of a plurality of shapes in a diagram;

create a dependency tree that defines parent and child relationships between the plurality of shapes and associations between the plurality of shapes according to physical positions of the plurality of shapes in the diagram;

determine a positional offset for each shape from a corresponding shape according to the associations defined by the dependency tree;

sequentially reposition at least a subset of the plurality of shapes in the diagram according to the dependency tree and at least one layout rule corresponding to the layout correction request, the at least one layout rule comprising instructions for positioning the plurality of shapes to comply with the layout correction request;

identify a conflict associated with a repositioned shape; and reposition at least one shape of the plurality of shapes according to a conflict resolution rule corresponding to the identified conflict.

15. The apparatus of claim 14, wherein the conflict comprises a shape overlapping another shape or a page break.

16. The apparatus of claim 14, wherein the conflict resolution rule comprises instructions to search for space on the diagram for the repositioned shape in a direction of the positional offset of the repositioned shape from a corresponding parent shape.

17. The apparatus of claim 14, wherein causing the computer to reposition the at least one shape of the plurality of shapes according to the conflict resolution rule corresponding to the identified conflict comprises causing the computer to reposition the repositioned shape and a first level of corresponding child shapes while maintaining the positional offset of the child shapes from the repositioned shape.

* * * * *